(12) United States Patent
Eden et al.

(10) Patent No.: US 11,965,691 B2
(45) Date of Patent: Apr. 23, 2024

(54) REFRIGERATOR APPLIANCE WITH SMART DRAWERS

(71) Applicant: Haier US Appliance Solutions, Inc., Wilmington, DE (US)

(72) Inventors: Kyle Robert Eden, Louisville, KY (US); Eric Scott Johnson, Louisville, KY (US); Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 33 days.

(21) Appl. No.: 17/569,646

(22) Filed: Jan. 6, 2022

(65) Prior Publication Data
US 2023/0228481 A1 Jul. 20, 2023

(51) Int. Cl.
| | |
|---|---|
| F25D 29/00 | (2006.01) |
| F25D 17/04 | (2006.01) |
| F25D 25/02 | (2006.01) |
| G06V 20/68 | (2022.01) |
| G08B 21/18 | (2006.01) |

(52) U.S. Cl.
CPC ......... F25D 29/005 (2013.01); F25D 17/045 (2013.01); F25D 25/025 (2013.01); G06V 20/68 (2022.01); G08B 21/182 (2013.01); F25D 2700/06 (2013.01)

(58) Field of Classification Search
CPC .... F25D 29/005; F25D 17/045; F25D 25/025; F25D 2700/06; G06V 20/68; G08B 21/182

USPC .......................................................... 340/585
See application file for complete search history.

(56) References Cited

U.S. PATENT DOCUMENTS

| | | | |
|---|---|---|---|
| 10,373,472 B2 | 8/2019 | Johnston | |
| 2005/0217282 A1* | 10/2005 | Strohm | A23B 7/152 62/78 |
| 2007/0104841 A1* | 5/2007 | Min | A23L 3/005 99/468 |
| 2010/0123379 A1* | 5/2010 | Crookshanks | F25D 23/00 312/405 |
| 2014/0139088 A1* | 5/2014 | Seeley | F25D 25/025 345/173 |
| 2017/0262973 A1* | 9/2017 | Johnston | G06T 7/13 |
| 2017/0263100 A1* | 9/2017 | Johnston | F25D 29/008 |
| 2018/0290809 A1* | 10/2018 | Espinosa | B65D 81/00 |
| 2018/0335252 A1* | 11/2018 | Oh | F25D 29/00 |

(Continued)

FOREIGN PATENT DOCUMENTS

| | | |
|---|---|---|
| CN | 109140873 A | 1/2019 |
| JP | 2016148503 A | 8/2016 |
| WO | WO2020236121 A1 | 11/2020 |

*Primary Examiner* — Zhen Y Wu
(74) *Attorney, Agent, or Firm* — Dority & Manning, P.A.

(57) ABSTRACT

Methods of operating a refrigerator appliance are provided. The refrigerator appliance includes a cabinet defining a food storage chamber with a drawer slidably mounted within the food storage chamber. The refrigerator appliance also includes a sensor operable to detect an atmospheric condition within the food storage chamber of the drawer and a camera assembly positioned and configured for monitoring the drawer. The methods generally include obtaining an image using the camera assembly and analyzing the image to identify a first food item and a second food item in the food storage chamber of the drawer.

14 Claims, 11 Drawing Sheets

(56) References Cited

U.S. PATENT DOCUMENTS

2019/0186817 A1* 6/2019 Hwang .................. F25D 11/02
2019/0226755 A1* 7/2019 Johnston ................ F25D 29/00
2019/0392382 A1* 12/2019 Han ...................... G06N 3/008
2021/0131721 A1* 5/2021 Kelly ................. B01D 46/0028

* cited by examiner

REFRIGERATOR APPLIANCE WITH SMART DRAWERS

FIELD OF THE INVENTION

The present subject matter relates generally to refrigerator appliances, and more particularly to systems and methods for managing the status of items, such as produce items, stored in such refrigerator appliances.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

Produce items, e.g., fruits and vegetables, stored in a refrigerator appliance go through various physical and chemical changes over time, e.g., ripening. Various different produce items may be incompatible with each other, such as may have differing storage requirements. For example, the optimal temperature, humidity and/or atmospheric composition for one produce item may differ from that of another produce item. Different produce items may also be incompatible for storage together due to differences in the changes that occur in each over time while stored, such as one produce item may generate a certain atmospheric chemical while ripening that is deleterious for other produce items.

Accordingly, a refrigerator appliance with systems for improved inventory management would be useful. More particularly, a refrigerator appliance that includes a produce inventory management system that is capable of monitoring produce inventory and tracking the status of such items during storage would be useful.

BRIEF DESCRIPTION OF THE INVENTION

Aspects and advantages of the invention will be set forth in part in the following description, or may be apparent from the description, or may be learned through practice of the invention.

In an exemplary embodiment, a method of operating a refrigerator appliance is provided. The refrigerator appliance includes a cabinet defining a food storage chamber with a drawer slidably mounted within the food storage chamber. The drawer is slidable between a closed position and an open position. The drawer includes a plurality of walls defining a food storage compartment. The refrigerator appliance also includes a sensor operable to detect an atmospheric condition within the food storage chamber of the drawer and a camera assembly positioned and configured for monitoring the drawer. The method includes obtaining an image using the camera assembly and analyzing the image to identify a first food item and a second food item in the food storage chamber of the drawer. The method also includes detecting, with the sensor, an atmospheric condition within the food storage chamber above a predetermined threshold, and identifying, based on the analysis of the image, one of the first food item and the second food item as the source of the atmospheric condition above the predetermined threshold.

In another exemplary embodiment, a method of operating a refrigerator appliance is provided. The refrigerator appliance includes a cabinet defining a food storage chamber with a drawer slidably mounted within the food storage chamber. The drawer is slidable between a closed position and an open position. The drawer includes a plurality of walls defining a food storage compartment. The refrigerator appliance also includes a sensor operable to detect an atmospheric condition within the food storage chamber of the drawer and a camera assembly positioned and configured for monitoring the drawer. The method includes obtaining an image using the camera assembly and analyzing the image to identify a first food item and a second food item in the food storage chamber of the drawer. The method also includes setting a first threshold for an atmospheric condition based on the identity of the first food item and setting a second threshold for the atmospheric condition based on the identity of the second food item. The method further includes monitoring the atmospheric condition by the sensor. The method also includes providing a first user notification when the atmospheric condition reaches the first threshold and providing a second user notification when the atmospheric condition reaches the second threshold.

In still another exemplary embodiment, a method of operating a refrigerator appliance is provided. The refrigerator appliance includes a cabinet defining a food storage chamber with a drawer slidably mounted within the food storage chamber. The drawer is slidable between a closed position and an open position. The drawer includes a plurality of walls defining a food storage compartment. The refrigerator appliance also includes a sensor operable to detect an atmospheric condition within the food storage chamber of the drawer and a camera assembly positioned and configured for monitoring the drawer. The method includes obtaining an image using the camera assembly and analyzing the image to identify a first food item and a second food item in the food storage chamber of the drawer. The method also includes determining that the first food item and the second food item are incompatible for co-storage and providing a user notification including a recommendation to relocate one of the first food item and the second food item.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
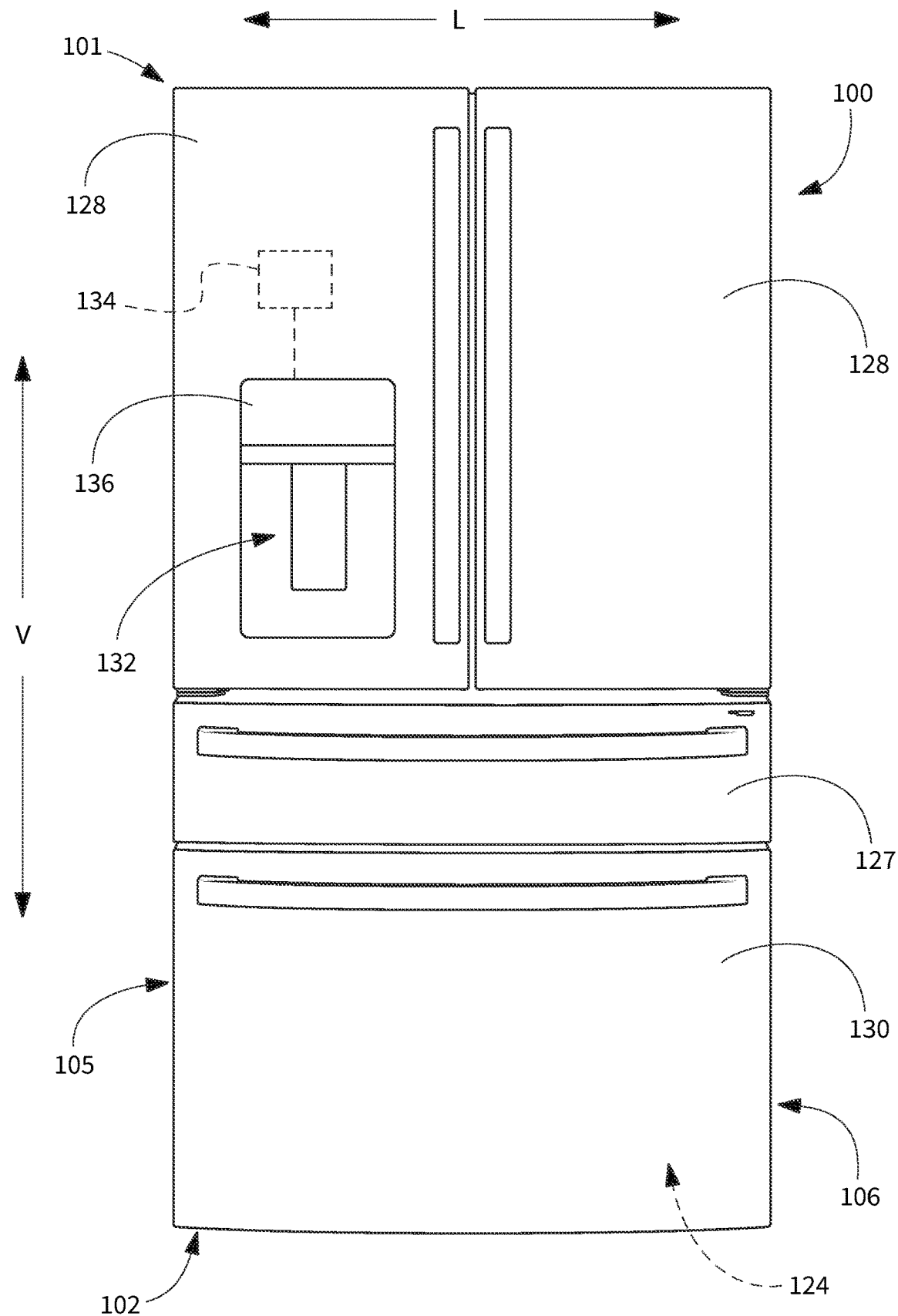
FIG. 1 provides a front view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
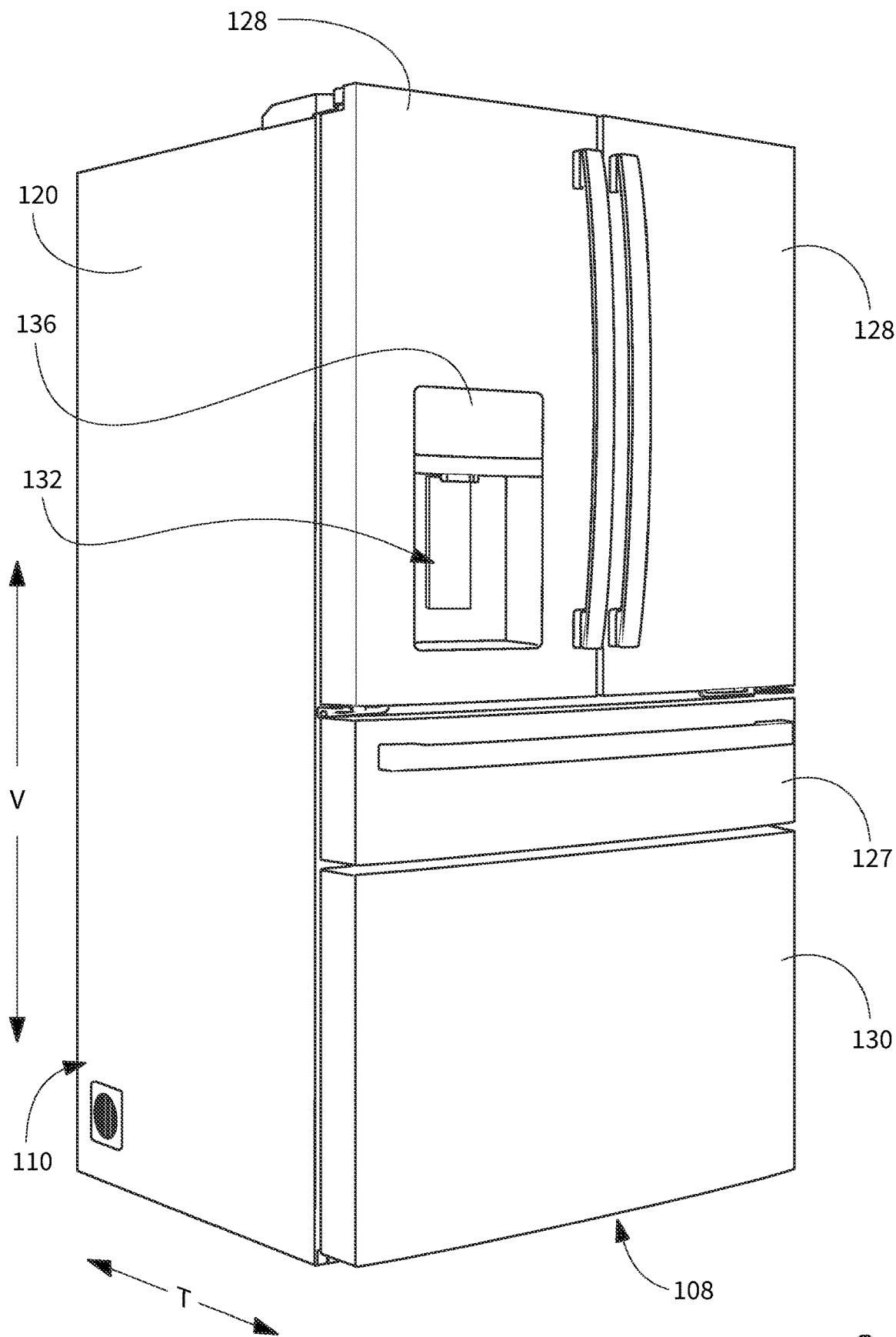
FIG. 2 provides a perspective view of the refrigerator appliance of FIG. 1.
Figure 3:
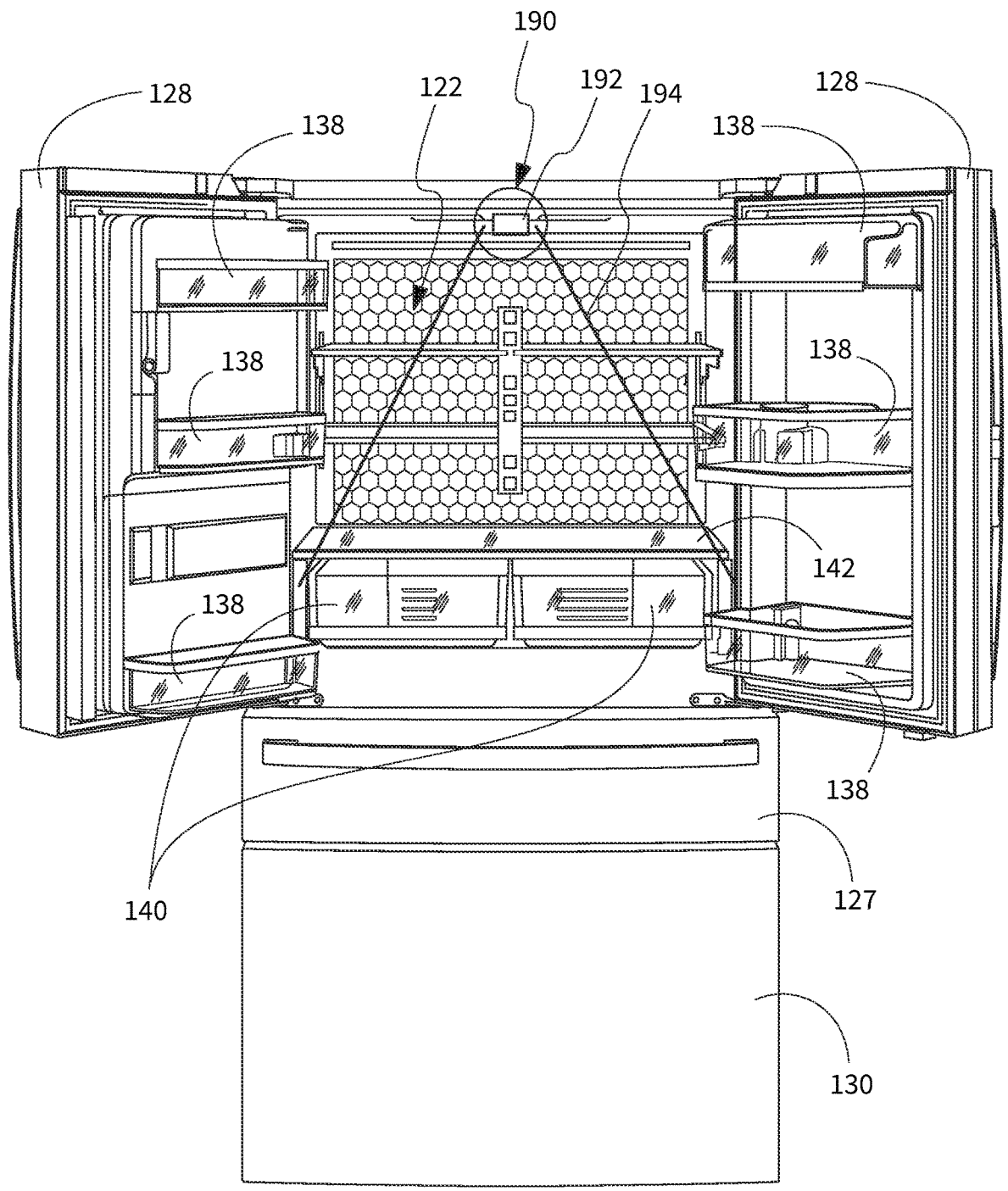
FIG. 3 provides a front view of the refrigerator appliance of FIG. 1 with doors thereof in an open position.

FIG. 1 is a front view of an exemplary embodiment of a refrigerator appliance 100. FIG. 2 is a perspective view of the refrigerator appliance 100. FIG. 3 is a front view of the refrigerator appliance 100 with fresh food doors 128 thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V and L. Refrigerator appliance 100 extends along the transverse direction T between a front portion 108 and a back portion 110.

Refrigerator appliance 100 includes a cabinet or housing 120 defining an upper fresh food chamber 122 (FIG. 3) and a lower freezer chamber or frozen food storage chamber 124 arranged below the fresh food chamber 122 along the vertical direction V. In some embodiments, an auxiliary food storage chamber (not shown) may be positioned between the fresh food storage chamber 122 and the frozen food storage chamber 124, e.g., along the vertical direction V. Because the frozen food storage chamber 124 is positioned below the fresh food storage chamber 122, refrigerator appliance 100 is generally referred to as a bottom mount refrigerator. In the exemplary embodiment, housing 120 also defines a mechanical compartment (not shown) for receipt of a sealed cooling system (not shown). Using the teachings disclosed herein, one of skill in the art will understand that the present invention can be used with other types of refrigerators (e.g., side-by-sides) as well. Consequently, the description set forth herein is for illustrative purposes only and is not intended to limit the invention in any aspect.

Refrigerator doors 128 are each rotatably hinged to an edge of housing 120 for accessing fresh food chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 128 for accessing freezer chamber 124. In the exemplary embodiment, freezer door 130 is coupled to a freezer drawer (not shown) slidably mounted within freezer chamber 124. An auxiliary door 127 may be coupled to an auxiliary drawer (not shown) which is slidably mounted within the auxiliary chamber (not shown).

Operation of the refrigerator appliance 100 can be regulated by a controller 134 that is operatively coupled to a user interface panel 136. User interface panel 136 provides selections for user manipulation of the operation of refrigerator appliance 100 to modify environmental conditions therein, such as temperature selections, etc.

In some embodiments, user interface panel 136 may be proximate a dispenser assembly 132. Panel 136 provides selections for user manipulation of the operation of refrigerator appliance 100 such as, e.g., temperature selections, selection of automatic or manual override humidity control (as described in more detail below), etc. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods and associated method steps as disclosed herein.

The controller 134 may be positioned in a variety of locations throughout refrigerator appliance 100. In the illustrated embodiment, the controller 134 may be located within the door 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. For example, the user interface 136 may include a touchscreen providing both input and display functionality. The user interface 136 may be in communication with the controller via one or more signal lines or shared communication busses.

As may be seen in FIG. 3, a plurality of food storage elements, such as bins 138, shelves 142, and drawers 140 are disposed within the fresh food storage chamber 122. As will be described in more detail below, the drawers 140 may be configured for storing produce, such as fruits and vegetables, and, in particular, the refrigerator appliance may be operable to provide, and configured for providing, improved shelf life of the produce stored therein. Thus, the drawers 140 may also be referred to as produce drawers 140 or as a vegetable drawer 140 and a fruit drawer 140. For example, in some embodiments, the refrigerator appliance may include two drawers 140, e.g., as illustrated in FIG. 3.

Referring now generally to FIGS. 3 through 6, refrigerator appliance 100 may further include an inventory management system that is generally configured to monitor one or more chambers of refrigerator appliance 100 to monitor the status of inventory stored therein. More specifically, as described in more detail below, inventory management system may include one or more sniffers or sensors 200 (see, e.g., FIGS. 4 and 5), cameras 192 (see, e.g., FIGS. 3 and 5), or other detection devices that are used to monitor fresh food chamber 122, and the drawers 140 in particular, to detect and monitor status of objects (e.g., identified generally by reference numeral 182 in FIG. 6) that are positioned in or removed from the drawers 140. In this regard, inventory management system may use data from each of these devices to obtain a representation or knowledge of the identity, position, and/or other qualitative or quantitative characteristics of objects 182, e.g., produce items such as fruits and/or vegetables, within the drawers 140. Although the inventory management system is described herein as monitoring drawers 140 for the detection of objects 182, it should be appreciated that aspects of the present subject matter may be used to monitor objects or items in any other suitable appliance, chamber, etc.

As shown schematically in FIG. 3, the inventory management system may include a camera assembly 190 that is generally positioned and configured for obtaining images of refrigerator appliance 100 during operation. Specifically, according to the illustrated embodiment, camera assembly 190 includes one or more cameras 192 that are mounted to cabinet 120, to doors 128, or are otherwise positioned in view of fresh food chamber 122. As shown in FIG. 3, a camera 192 of camera assembly 190 is mounted to cabinet 120 at a front opening of fresh food chamber 122 and is oriented to have a field of view 194 directed across the front opening and/or into fresh food chamber 122, and in particular into the drawers 140, such as when the drawers 140 are in an open position, such as extended forward generally along the transverse direction T such that one or both of the drawers 140 extend beyond (forward of) a front edge of a shelf 142 or shelves 142 between the camera assembly 190 and the drawers 140, such as above the drawers 140.

Although a single camera 192 is illustrated in FIG. 3, it should be appreciated that camera assembly 190 may include a plurality of cameras 192 positioned within cabinet 120, wherein each of the plurality of cameras 192 has a specified monitoring zone or range positioned around fresh food chamber 122. In this regard, for example, the field of view 194 of each camera 192 may be limited to or focused on a specific area within fresh food chamber 122, such as one camera 192 for each drawer 140.

Notably, however, it may be desirable to position each camera 192 proximate the front opening of fresh food chamber 122 and orient each camera 192 such that the field of view 194 is directed into fresh food chamber 122. In this manner, privacy concerns related to obtaining images of the user of the appliance 100 may be mitigated or avoided altogether. According to exemplary embodiments, camera assembly 190 may be used to facilitate an inventory management process for refrigerator appliance 100. As such, each camera 192 may be positioned at an opening to fresh food chamber 122 to monitor food items (identified generally as objects 182) that are being added to or removed from fresh food chamber 122, and in particular that are being placed in or removed from the drawers 140.

It should be appreciated that according to alternative embodiments, camera assembly 190 may include any suitable number, type, size, and configuration of camera(s) 192 for obtaining images of any suitable areas or regions within or around refrigerator appliance 100. In addition, it should be appreciated that each camera 192 may include features for adjusting the field of view and/or orientation.

It should be appreciated that the images obtained by camera assembly 190 may vary in number, frequency, angle, resolution, detail, etc. in order to improve the clarity of the particular regions surrounding or within refrigerator appliance 100. In addition, according to exemplary embodiments, controller 134 may be configured for illuminating the chilled chamber using one or more light sources prior to obtaining images. Notably, controller 134 of refrigerator appliance 100 (or any other suitable dedicated controller) may be communicatively coupled to camera assembly 190 and may be programmed or configured for analyzing the images obtained by camera assembly 190, e.g., in order to identify items being added or removed from refrigerator appliance 100, as described in more detail below.

In general, controller 134 may be operably coupled to camera assembly 190 for analyzing one or more images obtained by camera assembly 190 to extract useful information regarding objects 182 located within the drawers 140. In this regard, for example, images obtained by camera assembly 190 may be used to extract a barcode, identify a product, monitor the motion of the product, or obtain other product information related to object 182. Notably, this analysis may be performed locally (e.g., on controller 134) or may be transmitted to a remote server (e.g., in the "cloud," as those of ordinary skill in the art will recognize as referring to a remote server or database in a distributed computing environment including at least one remote server and the local controller 134) for analysis. Such analysis is intended to facilitate inventory management, e.g., by identifying a food item being added to or removed from the fresh food chamber 122.

Specifically, according to an exemplary embodiment, camera 192 (or multiple cameras 192 in the camera assembly 190 collectively) is oriented down from a top center of cabinet 120 and has a field of view 194 (e.g., as shown schematically in FIG. 3 and corresponding to the exemplary image of FIG. 6) that covers a width of fresh food chamber 122, e.g., a collective width of both drawers 140. In this manner, the field of view 194 of camera 192, and the resulting images obtained, may capture any motion or movement of an object into and/or out of drawers 140. The images obtained by camera assembly 190 may include one or more still images, one or more video clips, or any other suitable type and number of images suitable for identification of food items (e.g., identified generally by reference numeral 182) or inventory analysis.

Notably, camera assembly 190 may obtain images upon any suitable trigger, such as a time-based imaging schedule where camera assembly 190 periodically images and monitors the drawers 140. According to still other embodiments, camera assembly 190 may periodically take low-resolution images until motion (such as opening, e.g., sliding forward, of one or both drawers 140) is detected (e.g., via image differentiation of low-resolution images), at which time one or more high-resolution images may be obtained. According to still other embodiments, refrigerator appliance 100 may include one or more motion sensors (e.g., optical, acoustic, electromagnetic, etc.) that are triggered when an object 182 is being added to or removed from the drawers 140, and camera assembly 190 may be operably coupled to such motion sensors to obtain images of the object 182 during such movement.

According to still other embodiments, refrigerator appliance 100 may include a door switch that detects when refrigerator door 128 is opened, at which point camera assembly 190 may begin obtaining one or more images. According to exemplary embodiments, the image 300 may be obtained continuously or periodically while refrigerator doors 128 are open and/or while one or both drawers 140 are in the open position. In this regard, obtaining image 300 may include determining that a door and/or drawer of the refrigerator appliance is open and capturing images at a set frame rate while the door and/or drawer is open.

Notably, the motion of the food items between image frames may be used to determine whether the food item 182 is being removed from or added into fresh food chamber 122. It should be appreciated that the images obtained by camera assembly 190 may vary in number, frequency, angle, resolution, detail, etc. in order to improve the clarity of food items 182. In addition, according to exemplary embodiments, controller 134 may be configured for illuminating a refrigerator light (not shown) while obtaining image 300. Other suitable imaging triggers are possible and within the scope of the present subject matter.

Figure 4:
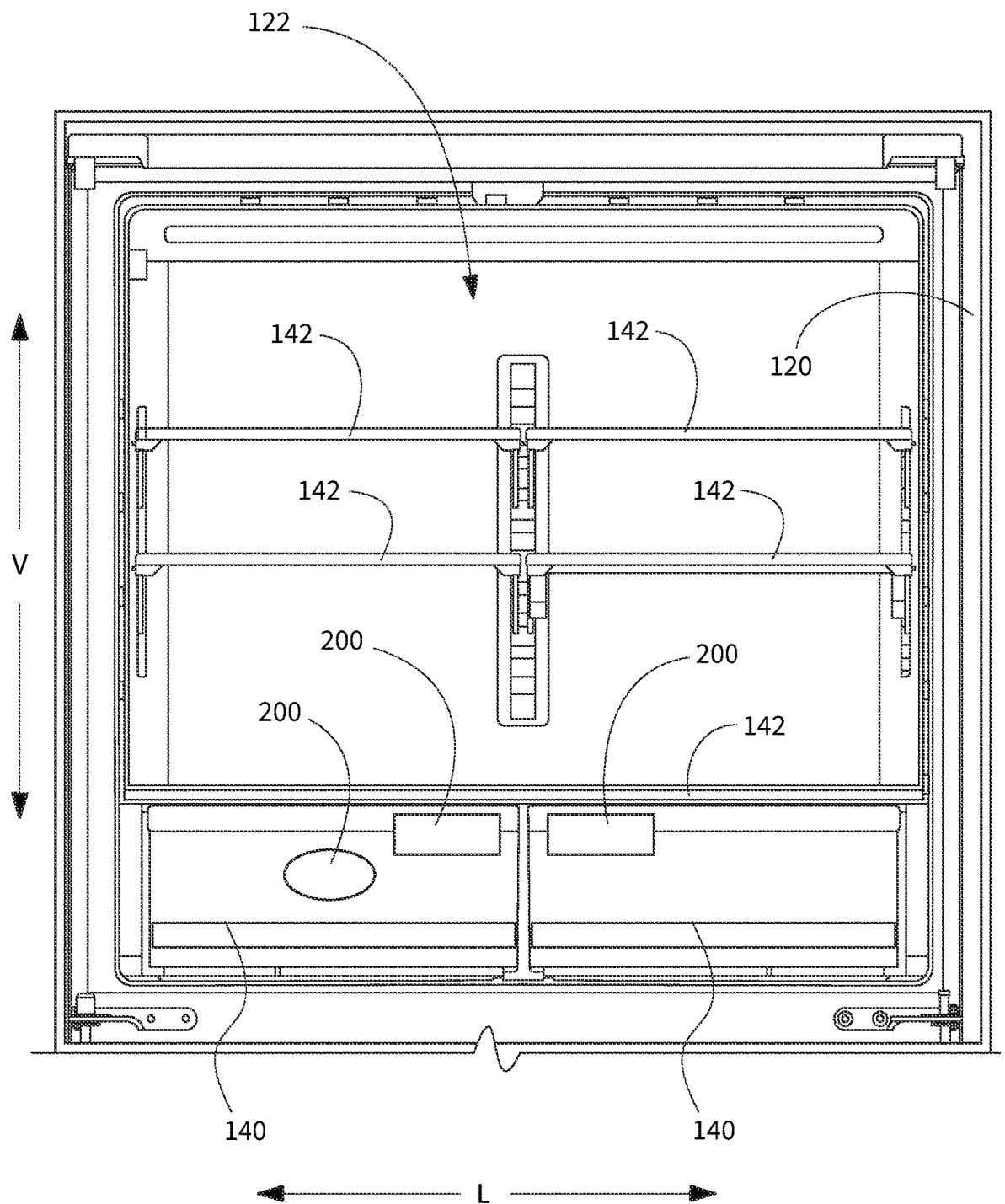
FIG. 4 provides a front view of a portion of a refrigerator appliance according to one or more exemplary embodiments of the present subject matter.
Figure 5:
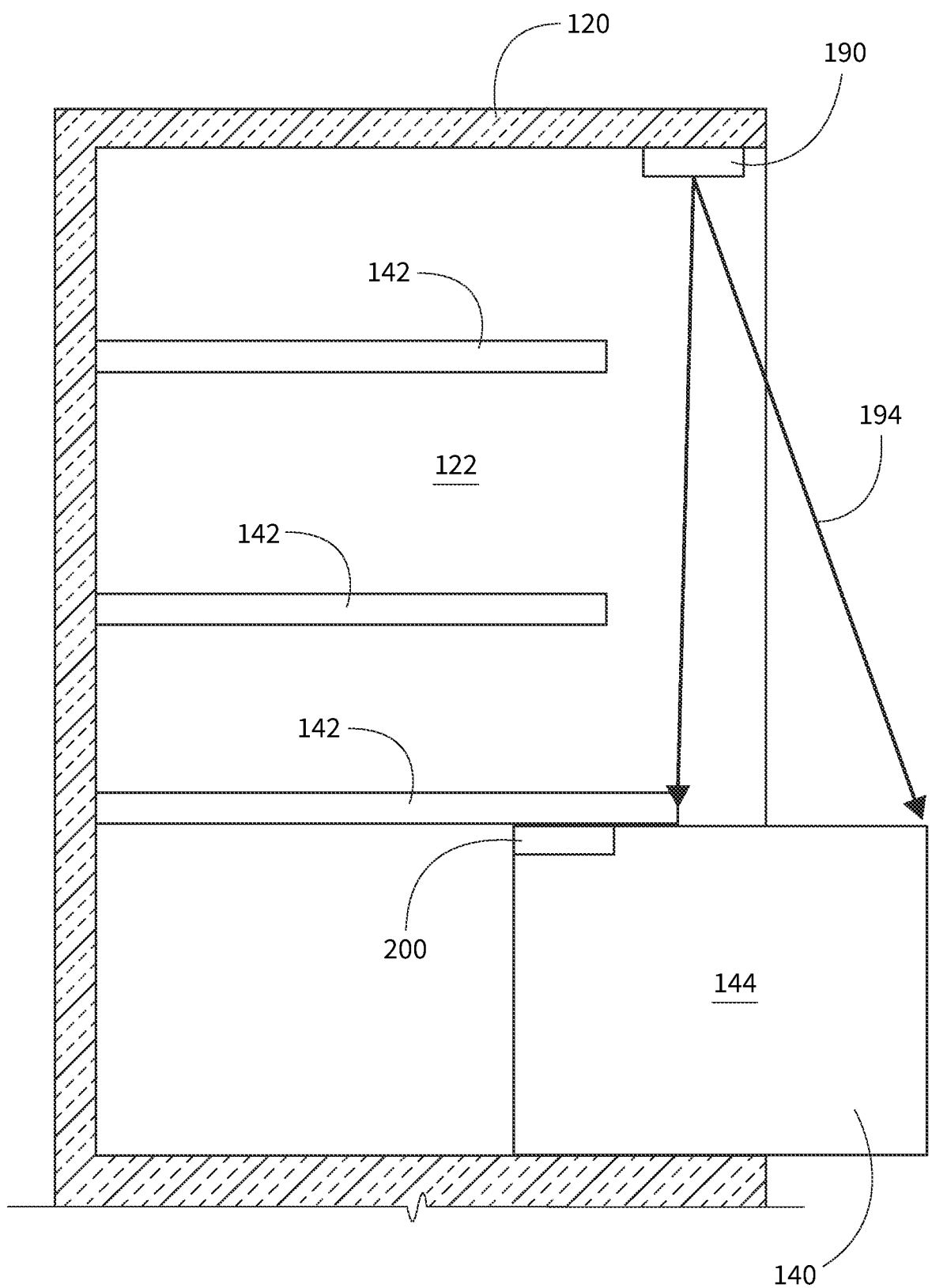
FIG. 5 provides a section view of the portion of the refrigerator appliance of FIG. 4.
Figure 6:
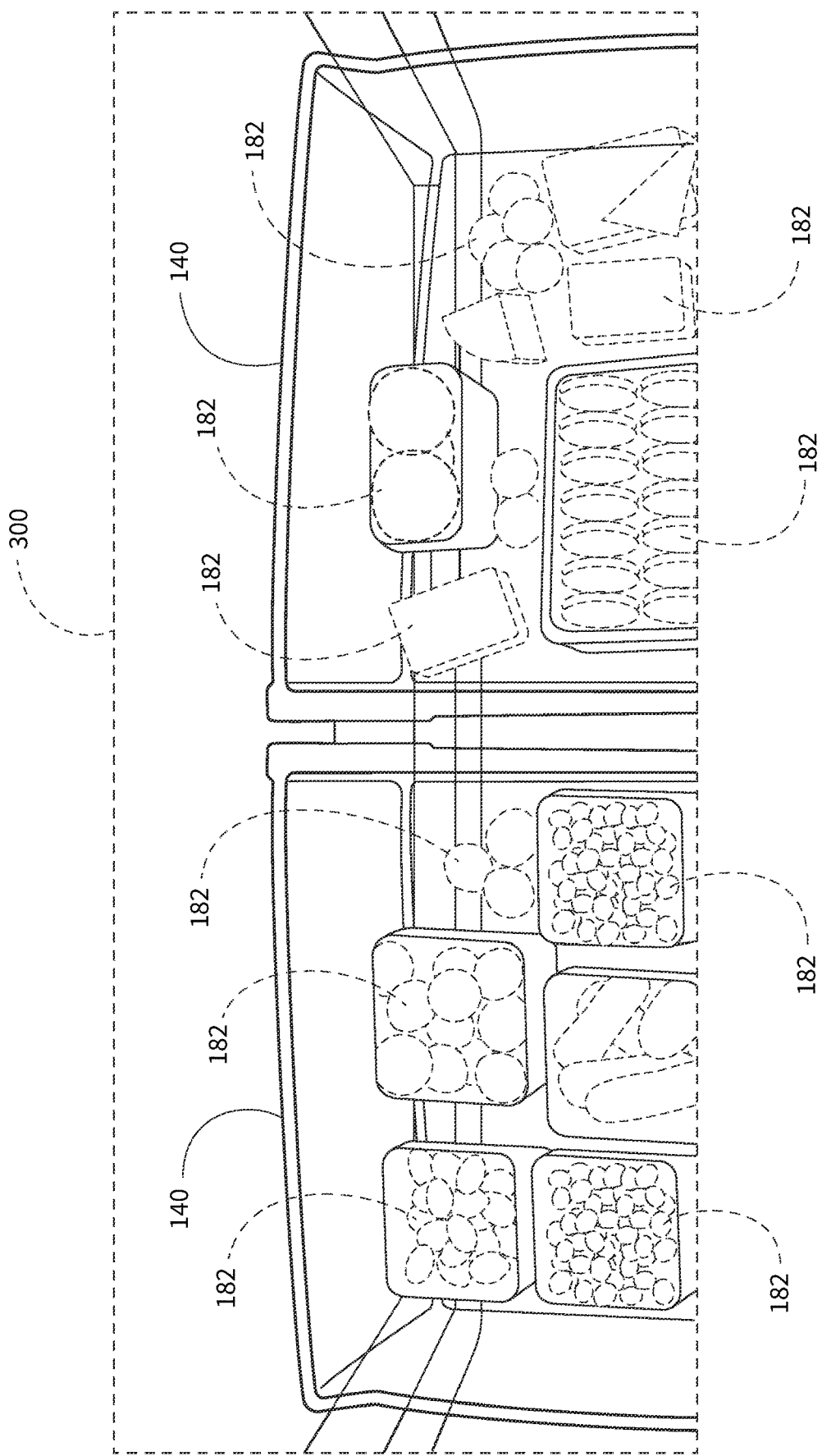
FIG. 6 illustrates an exemplary image of storage drawers of a refrigerator appliance, such as the exemplary refrigerator appliance of FIG. 1, in an open position and contents of the drawers, which image may be captured by a camera assembly in the refrigerator appliance.

As illustrated in FIGS. 4 and 5, in various embodiments, the refrigerator appliance 100 may include an atmospheric condition sensor or sniffer 200 in fluid communication with the fresh food chamber 122. For example, the sensor 200 may be positioned and configured within the housing 120, such as within the fresh food chamber 122 defined therein, such as within the drawer 140 in the fresh food chamber 122, such that fluid, e.g., gases, such as air or other atmospheric gases within the fresh food chamber 122 (and in particular within the drawer 140, such as within the food storage compartment 144 defined therein) flow to and around and/or across the sensor 200, whereby the sensor 200 may detect or monitor atmospheric conditions, such as atmospheric composition, temperature, humidity, and other similar atmospheric conditions within the fresh food chamber 122 and the drawer 140.

In some embodiments, multiple sensors 200 may be provided. For example, when sensor 200 is positioned in one of the drawers 140, another sensor 200 may be provided in the other drawer 140. As another example, multiple sensors 200 may be provided, each operable to and configured to measure different atmospheric conditions, such as a temperature sensor and a chemical sensor, e.g., the chemical sensor may be a sniffer that detects or measures a concentration of a particular chemical or type of chemicals, such as ethylene.

Figure 7:
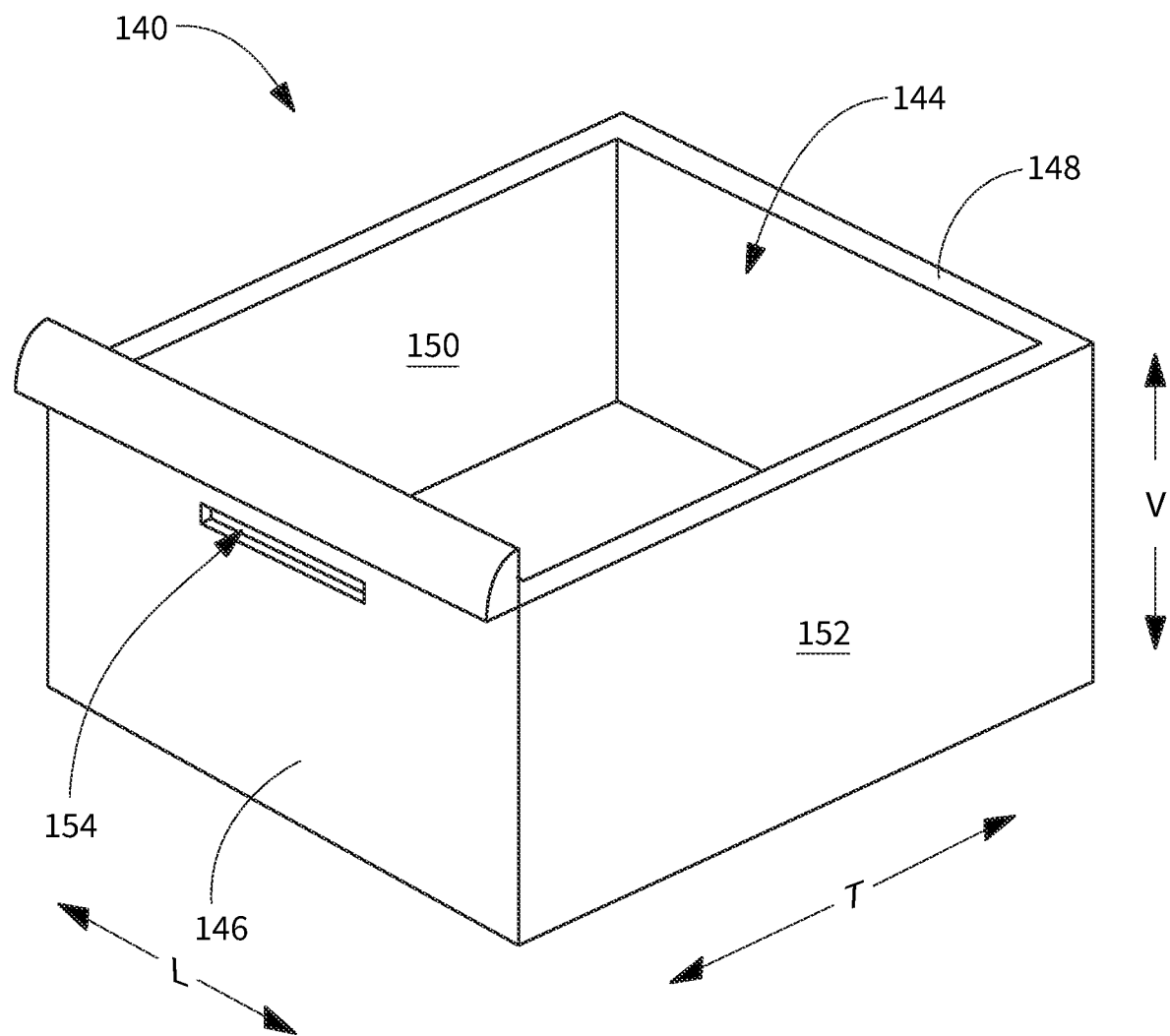
FIG. 7 provides a perspective view of a drawer which may be incorporated into a refrigerator appliance in one or more exemplary embodiments of the present subject matter.
Figure 8:
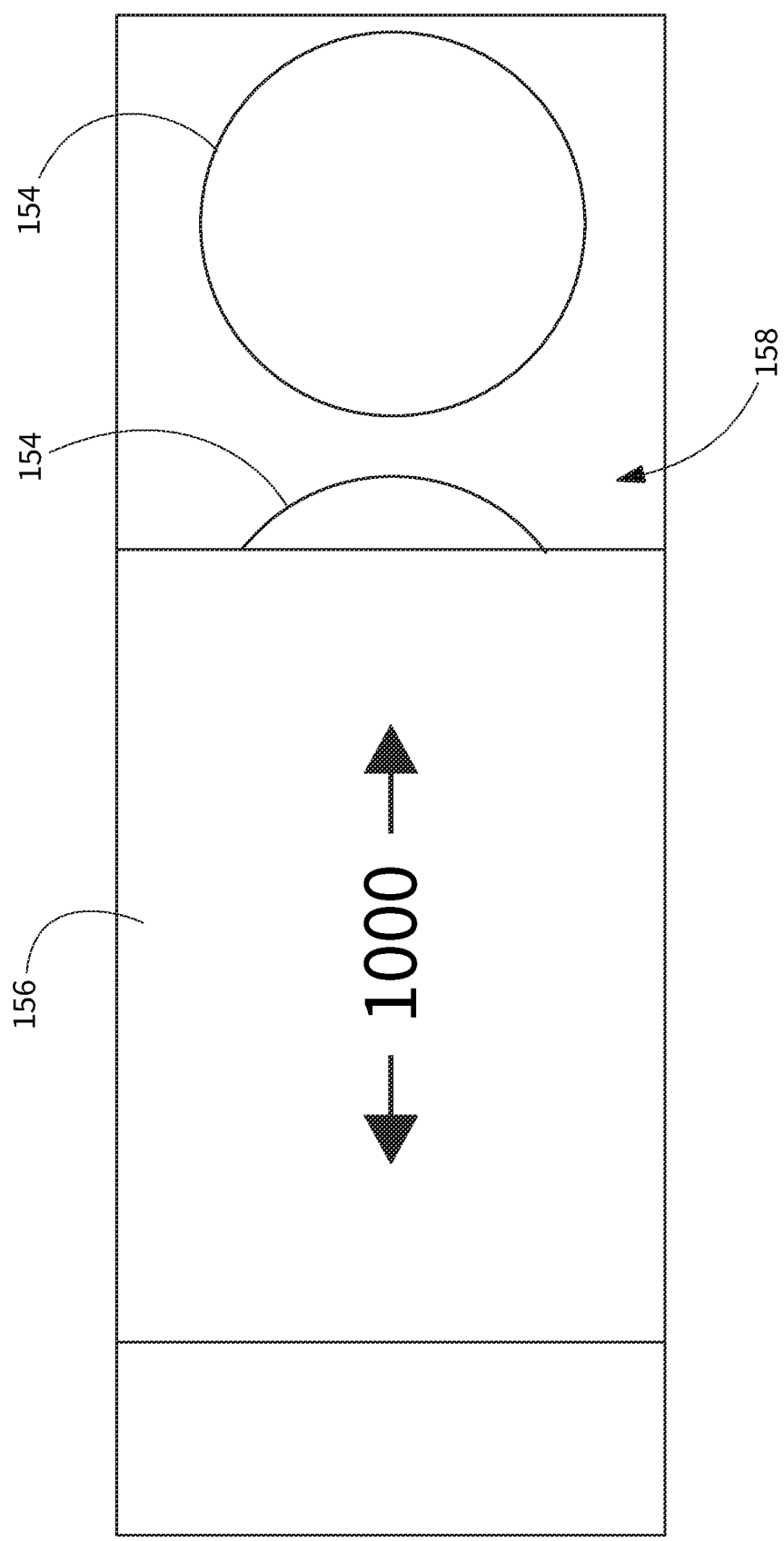
FIG. 8 provides an enlarged view of a portion of the drawer of FIG. 7.

Referring now to FIGS. 7 and 8, an exemplary drawer 140 may include a food storage compartment 144. The food storage compartment 144 may be defined by a plurality of walls of the drawer 140. For example, the plurality of walls may include a front wall 146, a back wall 148, a left wall 150, and a right wall 152. Directional terms such as "left" and "right" are used herein with reference to the perspective of a user standing in front of the refrigerator appliance 100 to access items stored therein. One of the walls, e.g., the front wall 146 as in the illustrated example embodiment of FIG. 7, may include one or more vent apertures 154 defined in and through the wall, e.g., the front wall 146. In such embodiments, the drawer 140 may include a humidity control knob, slider, or lever which adjusts the degree of openness of the vent aperture 154, such as a slider 156, e.g., as illustrated in FIG. 8. The slider 156 may be movable to selectively vary a degree of obstruction of the one or more vent apertures 154, such as between an open position where the one or more vent apertures are unobstructed to provide increased air circulation into and through the food storage compartment 144 and a closed position where the one or more vent apertures are obstructed or blocked by the slider 156 to restrict air flow into the food storage compartment 144.

For example, as illustrated in FIG. 8, the slider 156 may be movable in two generally opposing directions along a single line, e.g., along direction 1000 as indicted in FIG. 8, within a track 158. Additionally, those of ordinary skill in the art will recognize that the slider 156 may be movable through a plurality of intermediate positions between the open position and the closed position, such as the exemplary intermediate position illustrated in FIG. 8, where the one or more vent apertures are partially obstructed by the slider 156. Thus, the slider 156 may be movable within the track 158 in two opposing directions, e.g., back and forth, along direction 1000 between the open and closed positions and through a plurality of intermediate positions therebetween. In particular, the exemplary embodiment illustrated in FIG. 8 includes multiple vent apertures 154 and the slider 156 in an exemplary intermediate position where one vent aperture 154 is completely unobstructed or fully open and another adjacent vent aperture 154 is partially open, e.g., is partially obstructed.

Varying the position of the slider 156 as described provides varying levels of humidity within the food storage compartment 144 of the drawer 140. For example, when the slider is in the closed position or in an intermediate position, humidity (e.g., air having a relatively high moisture content as compared to ambient air outside of the refrigerator appliance and/or air within the remainder of the fresh food chamber 122 outside of the drawer 140) may accumulate within the food storage compartment 144 of the drawer 140, whereas when the slider 156 is in the open position, the humidity level within the drawer 140 will equilibrate with the ambient humidity level, e.g., within the remainder of the fresh food chamber 122 outside of the drawer 140. Further, the various intermediate positions provide a varying rate at which the humidity within the food storage compartment 144 of the drawer 140 will reach equilibrium with the humidity in the remainder of the fresh food chamber 122 outside of the drawer 140, such as faster equilibration (and resultingly lower humidity within the food storage compartment 144 of the drawer 140) as the intermediate position of the slider 156 approaches the open position and slower equilibration (and resultingly higher humidity within the food storage compartment 144 of the drawer 140) as the intermediate position of the slider 156 approaches the closed position. For example, the intermediate position illustrated in FIG. 8, with one vent aperture 154 open and another partially open and partially closed, permits some moisture to escape from the atmosphere within the food storage compartment 144 while also retaining a portion of the humidity, e.g., for produce items which prefer a moderate humidity level for storage.

Using the teachings disclosed herein, one of skill in the art will understand that the present subject matter can be used with other types of refrigerators such as a refrigerator/freezer combination, side-by-side, bottom mount, compact, and any other style or model of refrigerator appliance. Accordingly, other configurations of refrigerator appliance 100 could be provided, it being understood that the configurations shown in the accompanying FIGS. and the description set forth herein are by way of example for illustrative purposes only.

Now that the construction and configuration of refrigerator appliance 100 and camera assembly 190 have been presented according to an exemplary embodiment of the present subject matter, exemplary methods for operating a refrigerator appliance, such as refrigerator appliance 100, are provided. Such methods may also be used to operate a camera assembly, e.g., camera assembly 190, or any other suitable camera assembly for monitoring appliance operation or inventory. In this regard, for example, controller 134 may be configured for implementing one or more of the following exemplary methods. However, it should be appreciated that the exemplary methods are discussed herein only to describe exemplary aspects of the present subject matter, and are not intended to be limiting.

Figure 9:
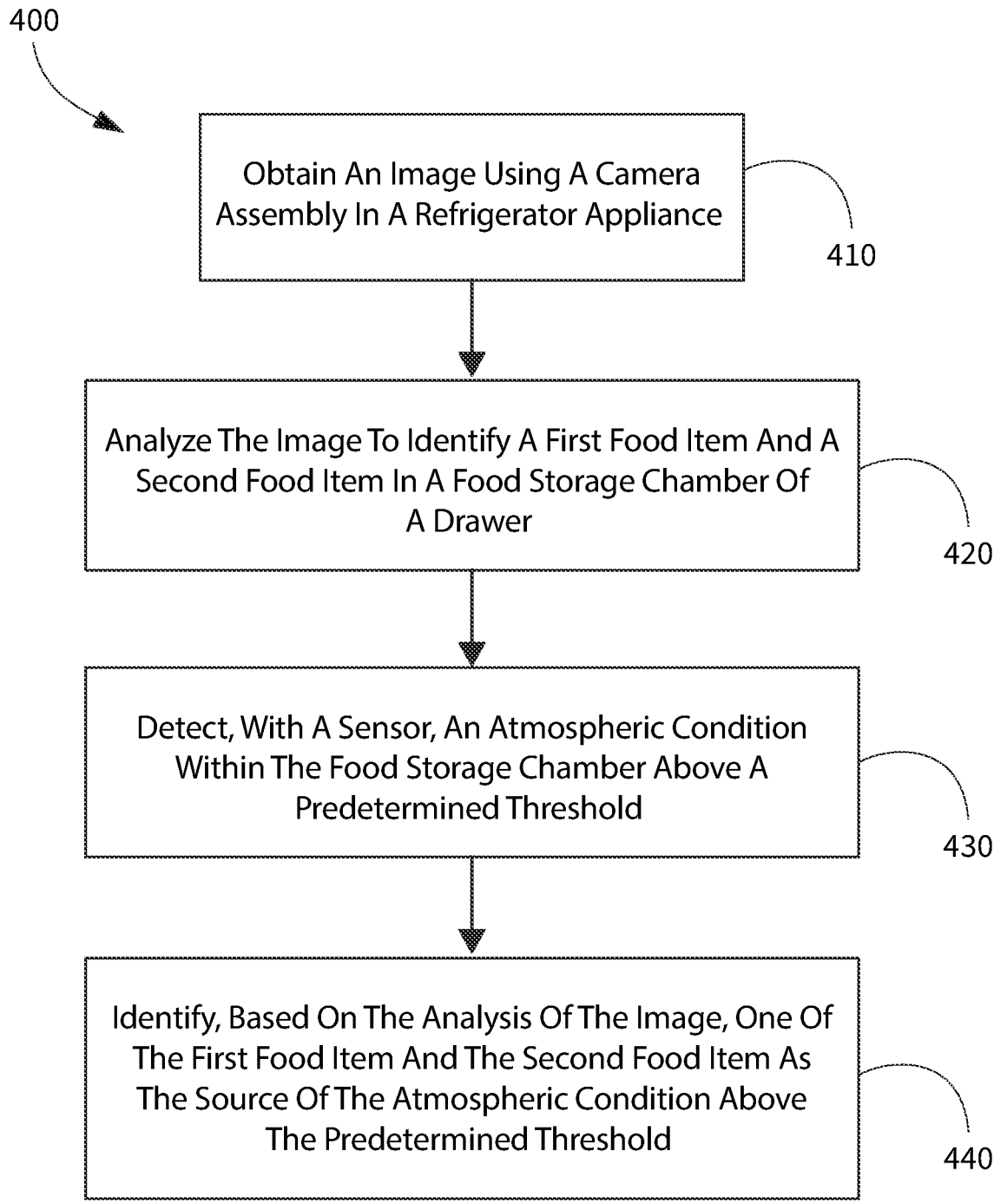
FIG. 9 provides a flow diagram of an exemplary method for operating a refrigerator appliance according to one or more exemplary embodiments of the present subject matter.

Turning now to FIG. 9, embodiments of the present disclosure may include a method 400 of operating a refrigerator appliance, such as the exemplary refrigerator appliance 100 described above. For example, the refrigerator appliance may include a controller and a cabinet defining a food storage chamber with a drawer slidably mounted within the food storage chamber. The drawer may be slidable between a closed position and an open position. The drawer may include a plurality of walls defining a food storage compartment. Also by way of example, the refrigerator may further include a sensor operable to detect an atmospheric condition within the food storage chamber of the drawer and a camera assembly positioned and configured for monitoring the drawer, as described above.

As shown in FIG. 9, method 400 includes, at step 410, obtaining an image of a chilled chamber of a refrigerator appliance using a camera assembly. For example, camera assembly 190 of refrigerator appliance 100 may obtain an image 300 (e.g., as shown for example in FIG. 6) within fresh food chamber 122 and/or food storage chamber 144 of drawer 140, which may include in its field of view a plurality of objects 182. In this regard, camera assembly 190 of refrigerator appliance 100 may obtain one or more images (e.g., such as image 300) of fresh food chamber 122, freezer chamber 124, or any other zone or region within or around refrigerator appliance 100.

In some embodiments, the method may also include, and/or the refrigerator appliance may further be configured for, identifying one or more food items, such as identifying a first food item and a second food item, e.g., based on one or more images. In some embodiments, identification of the food item may be accomplished with the camera assembly 190. For example, the refrigerator appliance may include a camera, and the step of identifying the food item may include identifying the food item based on an image captured by the camera. In some embodiments, the operation of the camera may be tied to the door opening, e.g., the camera may be operable and configured to capture an image each time the door is opened and/or each time the door is closed after detecting a door opening. The structure and operation of cameras are understood by those of ordinary skill in the art and, as such, the camera is not illustrated or described in further detail herein for the sake of brevity and clarity. In such embodiments, the controller 134 of the refrigerator appliance 100 may be configured for image-based processing, e.g., to identify a food item based on an image of the food item, e.g., a photograph of the food item taken with the camera(s) 192 of the camera assembly 190. For example, the controller 134 may be configured to identify the food item by comparison of the image to a stored image of a known or previously-identified food item.

In the exemplary embodiment illustrated in FIG. 9, the method 400 may include a step 420 of analyzing the image that was obtained at step 410 to identify a first food item and a second food item in the food storage chamber of the drawer. For example, controller 134 of refrigerator appliance 100 (or any other suitable dedicated controller) may be communicatively coupled to camera assembly 190 and may be programmed or configured for analyzing the images obtained by camera assembly 190, e.g., in order to identify items stored in refrigerator appliance 100, as described in more detail above.

Step 420 includes analyzing the image using to identify objects, e.g., at least a first food item and a second food item, which are disposed in the food storage chamber 144 of the drawer 140. It should be appreciated that this analysis may utilize any suitable image analysis techniques, image decomposition, image segmentation, image processing, etc. This analysis may be performed entirely by controller 134, may be offloaded to a remote server for analysis, may be analyzed with user assistance (e.g., via user interface panel 136), or may be analyzed in any other suitable manner. According to exemplary embodiments of the present subject matter, the analysis performed at step 420 may include a machine learning image recognition process.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor objects within fresh food chamber 122, such as within a drawer 140 therein. It should be appreciated that this image analysis or processing may be performed locally (e.g., by controller 134) or remotely (e.g., by offloading image data to a remote server or network, e.g., in the cloud).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance. For example, image differentiation may be used to determine when a pixel level motion metric passes a predetermined motion threshold.

The processing algorithm may further include measures for isolating or eliminating noise in the image comparison, e.g., due to image resolution, data transmission errors, inconsistent lighting, or other image imaging errors. By eliminating such noise, the image processing algorithms may improve accurate object detection, avoid erroneous object detection, and isolate the important object, region, or pattern within an image. In addition, or alternatively, the image processing algorithms may use other suitable techniques for recognizing or identifying particular items or objects, such as edge matching, divide-and-conquer searching, greyscale matching, histograms of receptive field responses, or another suitable routine (e.g., executed at the controller 134 based on one or more captured images from one or more cameras). Other image processing techniques are possible and within the scope of the present subject matter.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Referring again to FIG. 9 in particular, the exemplary method 400 may further include a step 430 of detecting that an atmospheric condition within the food storage chamber, e.g., food storage chamber 144, above a predetermined threshold. The predetermined threshold may, for example, be a default value stored in a memory of the controller. Atmospheric conditions may be monitored and/or detected with one or more sniffers or sensors 200, as described above. The predetermined threshold may be, for example, an ethylene level. Additional exemplary atmospheric conditions, and corresponding predetermined thresholds therefor, include a temperature, a humidity level, and/or a level or concentration of any other chemical or component in the atmosphere within the drawer, e.g., drawer 140.

Method 400 may also include a step 440 of identifying, based on the analysis of the image, one of the first food item and the second food item as the source of the atmospheric condition above the predetermined threshold. For example, the steps 420 and 440 may use the same image or multiple images from the same set of images, where the set of images includes multiple images of the same area or location taken over time. For example, the identification of one of the first food item and the second food item as the source of the atmospheric condition may include image analysis whereby a change in color in a food item, such as darkening or turning brown, etc., of a fruit item, vegetable item, or other similar produce item is recognized from a chronological series of images of the same objects in the drawer.

Also, it should be understood that the steps are not necessarily performed in a given order, e.g., the detection step 430 may occur prior to the identification of the first and second food items, such as the identification of the food items may occur in response to detecting an atmospheric condition above the predetermined threshold. As but one example of many possible examples, the atmospheric condition may be an ethylene level, and the predetermined threshold may be an excessive ethylene level, e.g., which may be excessive in that the level of ethylene may be detrimental to the storage of at least one produce item, where the method may thus include detecting an excessive ethylene level and, in response to detecting the ethylene level, obtaining and analyzing an image to locate the source of the ethylene level.

In some embodiments, method 400 may further include providing a user notification. The user notification may include an indication or identification of the one of the first food item and the second food item that was identified as the source of the atmospheric condition above the predetermined threshold.

In some embodiments, the sensor may be operable to detect the atmospheric condition within the food storage chamber of the drawer when the drawer is in the closed position, such as step 430 may be performed when the drawer is in the closed position. For example, the controller may ping or query the sensor when the drawer is in the closed position, where the closed position may be detected by the controller based on a position switch or position sensor (such as a Hall effect sensor) and/or based on an image from the camera assembly, where the controller may analyze such image to recognize and detect when the drawer is in the closed position. Measuring or detecting the atmospheric condition while the drawer is in the closed position may advantageously provide a more accurate reading of the atmosphere within the drawer itself, such as in the food storage compartment therein, as opposed to ambient conditions outside of the drawer, e.g., in the remainder of the fresh food compartment and/or outside of the refrigerator appliance.

In some embodiments, the camera assembly may be positioned and configured for monitoring the food storage chamber of the drawer when the drawer is in the open position. For example, images of the contents within the drawer may be advantageously clearer, e.g., less obstructed, when the images are obtained while the drawer is in the open position, such as the drawer may be extended outward away from other contents and structures, e.g., shelves, in the refrigerator when the drawer is in the open position, thereby allowing a clearer and more complete observation of the interior of the drawer and contents thereof when the drawer is in the open position.

In some embodiments, the drawer may also include a vent aperture defined in and through one of the plurality of walls. In such embodiments, the camera assembly may be positioned and configured for monitoring the vent aperture of the drawer, e.g., the vent aperture may be positioned within the field of view of the camera. Such embodiments may also include determining an optimal humidity level for at least one of the first food item and the second food item and determining an optimal position for a slider at the vent aperture corresponding to the determined optimal humidity. Exemplary embodiments in which the camera assembly is positioned and configured for monitoring the vent aperture of the drawer may further include analyzing the image to determine whether the slider at the vent aperture is in the optimal position, and providing a user notification when the slider at the vent aperture is not in the optimal position, where the user notification may be, e.g., audible and/or visual, as described in more detail below, and may be provided locally and/or remotely, also as described in more detail below.

Figure 10:
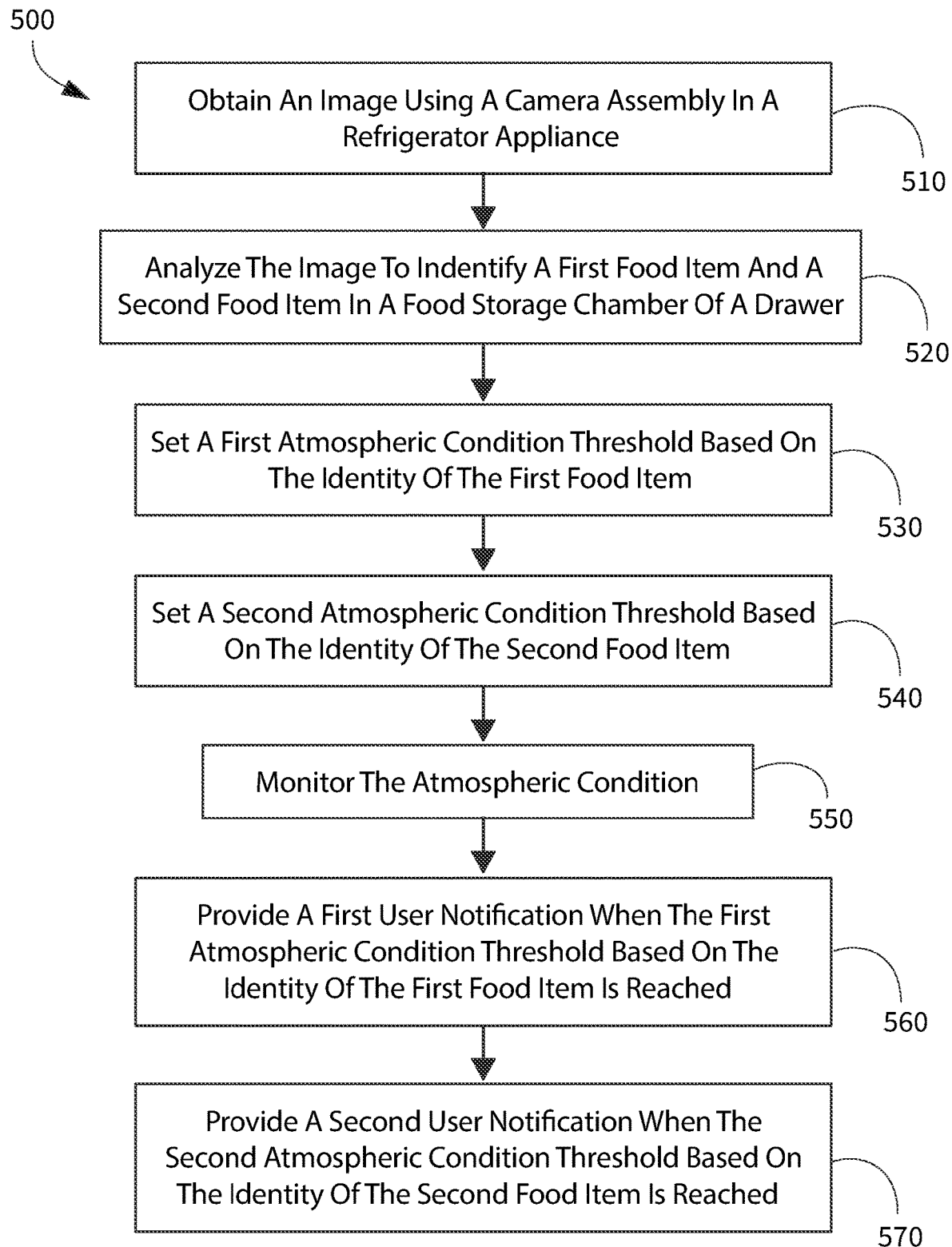
FIG. 10 provides a flow diagram of another exemplary method for operating a refrigerator appliance according to one or more additional exemplary embodiments of the present subject matter.

Turning now to FIG. 10, embodiments of the present disclosure may include a method 500 of operating a refrigerator appliance, such as the exemplary refrigerator appliance 100 described above. For example, the refrigerator appliance may include a controller and a plurality of food storage drawers, etc., as described above.

Method 500 also includes an image obtaining step 510 and an analysis and identification step 520, which are similar to steps 410 and 420 described above, and such description is not repeated for the sake of brevity.

In contrast to the predetermined threshold described above with respect to exemplary method 400, method 500 may include defining new or additional thresholds for one or more atmospheric conditions in the refrigerator appliance, such as in the drawer 140. For example, the one or more thresholds may be based on and/or in response to the identified food items, such as an expected or anticipated ethylene level for a particular type of produce item, where the expected or anticipated ethylene level corresponds to the identified food item being ripe (or overripe, etc.). Thus, in some embodiments, exemplary method 500 may include a step 530 of setting a first threshold for an atmospheric condition based on the identity of the first food item and a step 540 of setting a second threshold for the atmospheric condition based on the identity of the second food item. In at least some embodiments, the first food item may be different from the second food item, and thus the first threshold may also be different from the second threshold, although different food items may not necessarily have different thresholds.

As illustrated in FIG. 10, method 500 may further include a step 550 of monitoring the atmospheric condition for which the first and second thresholds were set at steps 530 and 540. Such monitoring may be performed at least in part by the sensor, such as by the controller of the refrigerator appliance which is in operative communication with the sensor, e.g., exemplary methods may include monitoring the atmospheric condition using the sensor and/or by the sensor.

Still referring to FIG. 10, method 500 may also include steps of providing one or more user notifications. Such notifications may be provided locally, e.g., on the user interface panel 136 of the refrigerator appliance 100, and/or remotely, such as on a remote device not directly physically attached or connected to the refrigerator appliance, e.g., a smartphone, smart home system, or other similar device. The user notification may include one or more of a visual notification, e.g., illuminating an indicator light or providing a text notification, and/or an audible notification, such as a chime or alert tone, etc. For example, method 500 may include a step 560 of providing a first user notification when the first atmospheric condition threshold based on the identity of the first food item is reached, and a step 570 of providing a second user notification when the second atmospheric condition threshold based on the identity of the second food item is reached. Thus, for example, customized and responsive monitoring and inventory management may be provided in method 500, where each food item is tracked separately and specifically based on atmospheric conditions which are more significant or sensitive for the particular identified food item.

In some embodiments, the first atmospheric condition threshold of step 530 may include a first ethylene level and the second atmospheric condition threshold of step 540 may include a second ethylene level.

In some embodiments, the sensor may be operable to detect the atmospheric condition within the food storage chamber of the drawer when the drawer is in the closed position. For example, the controller may ping or query the sensor when the drawer is in the closed position, where the closed position may be detected by the controller based on a position switch or position sensor (such as a Hall effect sensor) and/or based on an image from the camera assembly, where the controller may analyze such image to recognize and detect when the drawer is in the closed position. Measuring or detecting the atmospheric condition while the drawer is in the closed position may advantageously provide a more accurate reading of the atmosphere within the drawer itself, such as in the food storage compartment therein, as opposed to ambient conditions outside of the drawer, e.g., in the remainder of the fresh food compartment and/or outside of the refrigerator appliance.

In some embodiments, the camera assembly may be positioned and configured for monitoring the food storage chamber of the drawer when the drawer is in the open position. For example, images of the contents within the drawer may be advantageously clearer, e.g., less obstructed, when the images are obtained while the drawer is in the open position, such as the drawer may be extended outward away from other contents and structures, e.g., shelves, in the refrigerator when the drawer is in the open position, thereby allowing a clearer and more complete observation of the interior of the drawer when the drawer is in the open position.

In some embodiments, the drawer may also include a vent aperture defined in and through one of the plurality of walls. In such embodiments, the camera assembly may be positioned and configured for monitoring the vent aperture of the drawer, e.g., the vent aperture may be positioned within the field of view of the camera. Such embodiments may also include determining an optimal humidity level for at least one of the first food item and the second food item and determining an optimal position for a slider at the vent aperture corresponding to the determined optimal humidity. Further, such embodiments may also or instead include a humidity level as the first and second thresholds for the atmospheric condition, e.g., the atmospheric condition may be humidity, and the first and second thresholds may each be a humidity level. Exemplary embodiments in which the camera assembly is positioned and configured for monitoring the vent aperture of the drawer may further include analyzing the image to determine whether the slider at the vent aperture is in the optimal position, and providing a user notification when the slider at the vent aperture is not in the optimal position, where the user notification may be, e.g., audible and/or visual, as described above, and may be provided locally and/or remotely, also as described above.

Figure 11:
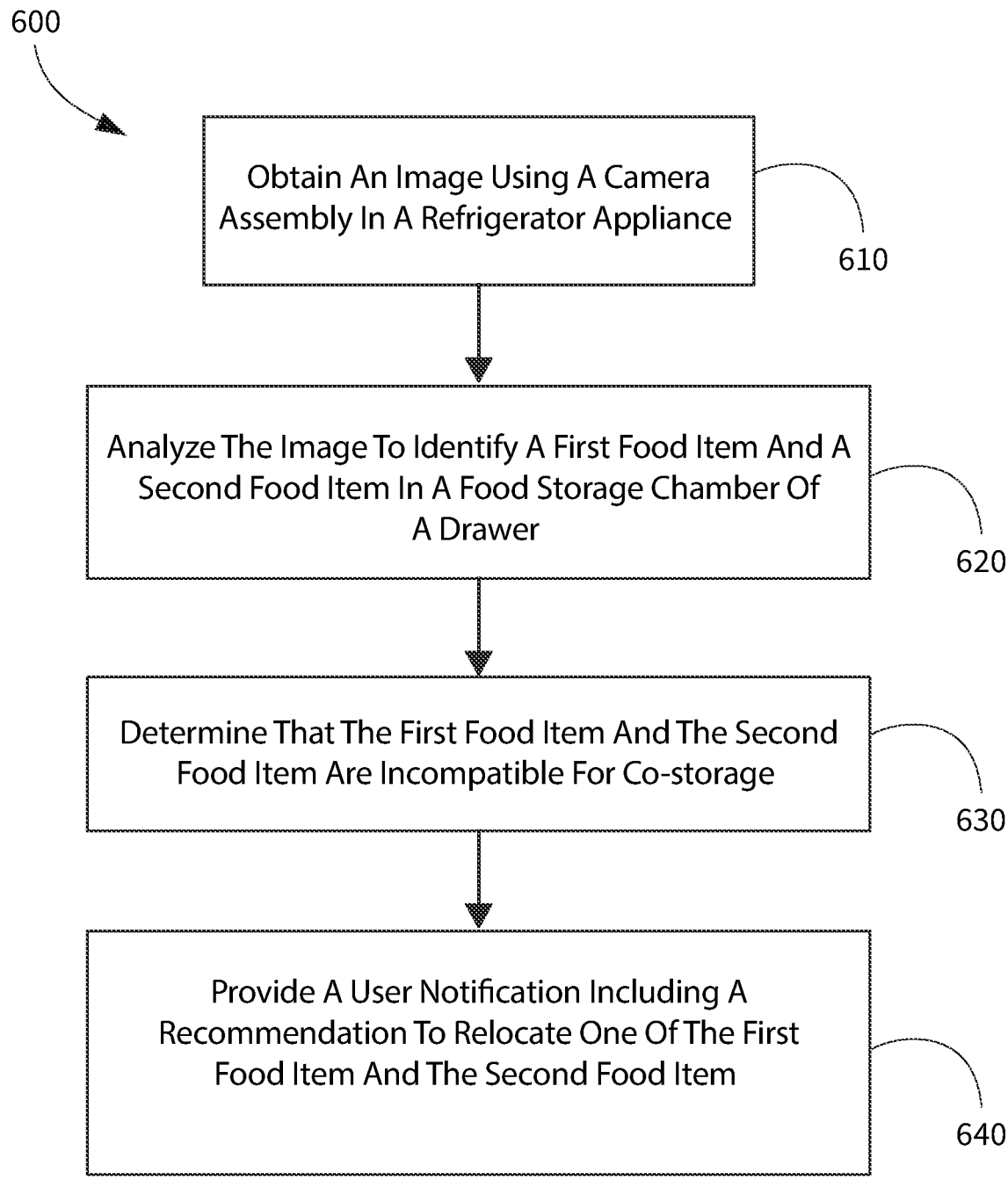
FIG. 11 provides a flow diagram of still another exemplary method for operating a refrigerator appliance according to one or more additional exemplary embodiments of the present subject matter.

Turning now to FIG. 11, embodiments of the present disclosure may also include a method 600 of operating a refrigerator appliance, such as the exemplary refrigerator appliance 100 described above. For example, the refrigerator appliance may include a controller and a plurality of food storage drawers, etc., as described above.

Method 600 also includes an image obtaining step 610 and an analysis and identification step 620, which are similar to steps 410/510 and 420/520 described above, and such description is not repeated for the sake of brevity.

Method 600 may also include a step 630 of determining that the first food item and the second food item are incompatible for co-storage. For example, such incompatibility may include different optimal humidity levels and/or temperatures. As another example, such incompatibility may also or instead include one of the first food item and the second food item being an ethylene producer, e.g., which generates or gives off a high amount of ethylene (as compared to other produce items) as it ripens or ages, and the other of the first food item and the second food item being ethylene sensitive, e.g., where exposure to levels of ethylene given off by the one food item may accelerate the aging rate of the other food item. In such embodiments, the determination of incompatibility may be based at least in part on an ethylene production rate of one of the first food item and the second food item.

After determining that the first food item and the second food item are incompatible for co-storage, and in response to such determination, the method 600 may then include a step 640 of providing a user notification including a recommendation to relocate one of the first food item and the second food item. For example, when more than one drawer is included in the refrigerator appliance, the recommendation may include recommending to move the one food item to another drawer. As another example, the recommendation may include recommending to move the one food item to another part of the fresh food chamber, e.g., outside of the drawer or drawers, or may include recommending to store the one food item at room temperature, e.g., outside of the refrigerator appliance. Further, such examples are not required, e.g., the user notification may simply provide a recommendation to remove or relocate the one food item from the drawer without specifying to where the one food item should be moved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance, the refrigerator appliance comprising a cabinet defining a food storage chamber with a drawer slidably mounted within the food storage chamber whereby the drawer is slidable between a closed position and an open position, the drawer comprising a plurality of walls defining a food storage compartment and a vent aperture defined in and through one of the plurality of walls, a sensor operable to detect an atmospheric condition within the food storage chamber of the drawer, and a camera assembly positioned and configured for monitoring the vent aperture of the drawer, the method comprising:
    obtaining an image using the camera assembly;
    analyzing the image to identify a first food item and a second food item in the food storage chamber of the drawer;
    detecting, with the sensor, an atmospheric condition within the food storage chamber above a predetermined threshold;
    identifying, based on the analysis of the image, one of the first food item and the second food item as the source of the atmospheric condition above the predetermined threshold;
    determining an optimal humidity level for at least one of the first food item and the second food item;
    determining an optimal position for a slider at the vent aperture corresponding to the determined optimal humidity;
    analyzing the image to determine whether the slider at the vent aperture is in the optimal position; and
    providing a user notification when the slider at the vent aperture is not in the optimal position.

2. The method of claim 1, wherein the atmospheric condition comprises an ethylene level.

3. The method of claim 1, wherein the sensor is operable to detect the atmospheric condition within the food storage chamber of the drawer when the drawer is in the closed position.

4. The method of claim 1, wherein the camera assembly is positioned and configured for monitoring the food storage chamber of the drawer when the drawer is in the open position.

5. The method of claim 1, wherein the atmospheric condition detected with the sensor is a first atmospheric condition, further comprising setting a first threshold for a second atmospheric condition based on the identity of the first food item, setting a second threshold for the second atmospheric condition based on the identity of the second food item, monitoring the second atmospheric condition by the sensor, providing a first user notification when the second atmospheric condition reaches the first threshold, and providing a second user notification when the second atmospheric condition reaches the second threshold.

6. A method of operating a refrigerator appliance, the refrigerator appliance comprising a cabinet defining a food storage chamber with a drawer slidably mounted within the food storage chamber whereby the drawer is slidable between a closed position and an open position, the drawer comprising a plurality of walls defining a food storage compartment and a vent aperture defined in and through one of the plurality of walls, a sensor operable to detect an atmospheric condition within the food storage chamber of the drawer, and a camera assembly positioned and configured for monitoring the vent aperture of the drawer, the method comprising:
    obtaining an image using the camera assembly;
    analyzing the image to identify a first food item and a second food item in the food storage chamber of the drawer;
    setting a first threshold for an atmospheric condition based on the identity of the first food item;
    setting a second threshold for the atmospheric condition based on the identity of the second food item;
    monitoring the atmospheric condition by the sensor;
    providing a first user notification when the atmospheric condition reaches the first threshold;
    providing a second user notification when the atmospheric condition reaches the second threshold;
    determining an optimal humidity level for at least one of the first food item and the second food item;
    determining an optimal position for a slider at the vent aperture corresponding to the determined optimal humidity;
    analyzing the image to determine whether the slider at the vent aperture is in the optimal position; and
    providing a third user notification when the slider at the vent aperture is not in the optimal position.

7. The method of claim 6, wherein the first threshold comprises a first ethylene level and the second threshold comprises a second ethylene level.

8. The method of claim 6, wherein the sensor is operable to detect the atmospheric condition within the food storage chamber of the drawer when the drawer is in the closed position.

9. The method of claim 6, wherein the camera assembly is positioned and configured for monitoring the food storage chamber of the drawer when the drawer is in the open position.

10. A method of operating a refrigerator appliance, the refrigerator appliance comprising a cabinet defining a food storage chamber with a drawer slidably mounted within the food storage chamber whereby the drawer is slidable between a closed position and an open position, the drawer comprising a plurality of walls defining a food storage compartment and a vent aperture defined in and through one of the plurality of walls, a sensor operable to detect an atmospheric condition within the food storage chamber of the drawer, and a camera assembly positioned and configured for monitoring the vent aperture of the drawer, the method comprising:
    obtaining an image using the camera assembly;
    analyzing the image to identify a first food item and a second food item in the food storage chamber of the drawer;
    determining that the first food item and the second food item are incompatible for co-storage;
    providing a user notification including a recommendation to relocate one of the first food item and the second food item;
    determining an optimal humidity level for the other of the first food item and the second food item;
    determining an optimal position for a slider at the vent aperture corresponding to the determined optimal humidity;
    analyzing the image to determine whether the slider at the vent aperture is in the optimal position; and
    providing a user notification when the slider at the vent aperture is not in the optimal position.

11. The method of claim 10, wherein the determination of incompatibility is based at least in part on an ethylene production rate of one of the first food item and the second food item.

12. The method of claim 10, wherein the sensor is operable to detect the atmospheric condition within the food storage chamber of the drawer when the drawer is in the closed position.

13. The method of claim 10, wherein the camera assembly is positioned and configured for monitoring the food storage chamber of the drawer when the drawer is in the open position.

14. The method of claim 10, wherein analyzing the image further comprises identifying a third food item in the food storage chamber of the drawer, further comprising setting a first threshold for an atmospheric condition based on the identity of the other of the first food item and the second food item, setting a second threshold for the atmospheric condition based on the identity of the third food item, monitoring the atmospheric condition by the sensor, providing a first user notification when the atmospheric condition reaches the first threshold, and providing a second user notification when the atmospheric condition reaches the second threshold.

* * * * *